(12) United States Patent
Sasaki

(10) Patent No.: US 7,017,158 B2
(45) Date of Patent: Mar. 21, 2006

(54) MULTI-PROCESSOR SYSTEM, DATA PROCESSING SYSTEM, DATA PROCESSING METHOD, AND COMPUTER PROGRAM

(75) Inventor: Nobuo Sasaki, Kanagawa (JP)

(73) Assignee: Sony Computer Entertainment Inc., (JP)

( * ) Notice: Subject to any disclaimer, the term of this patent is extended or adjusted under 35 U.S.C. 154(b) by 684 days.

(21) Appl. No.: 09/964,247

(22) Filed: Sep. 26, 2001

(65) Prior Publication Data

US 2002/0059509 A1    May 16, 2002

(30) Foreign Application Priority Data

Sep. 27, 2000  (JP) .......................... P2000-294732
Sep. 21, 2001  (JP) .......................... P2001-289588

(51) Int. Cl.
   *G06F 9/00* (2006.01)
(52) U.S. Cl. .......................... 718/103; 712/10; 712/13; 712/15; 712/22
(58) Field of Classification Search ................. 712/22, 712/10, 13, 15; 718/103
   See application file for complete search history.

(56) References Cited

U.S. PATENT DOCUMENTS

| | | | |
|---|---|---|---|
| 4,739,476 A | * | 4/1988 | Fiduccia ....................... 712/22 |
| 5,230,057 A | | 7/1993 | Shido et al. |
| 5,511,212 A | * | 4/1996 | Rockoff ........................ 712/22 |
| 5,655,079 A | | 8/1997 | Hirasawa et al. |
| 5,805,915 A | * | 9/1998 | Wilkinson et al. ............. 712/20 |
| 6,516,403 B1 | * | 2/2003 | Koyanagi .................... 712/203 |

FOREIGN PATENT DOCUMENTS

| | | |
|---|---|---|
| EP | 0 360 527 A2 | 3/1990 |
| EP | 0 411 497 A2 | 2/1991 |
| JP | 61283976 A | 12/1986 |
| JP | 02047757 A | 2/1990 |
| JP | 02081258 A | 3/1990 |
| JP | 03062255 A | 3/1991 |
| JP | 07084966 A | 3/1995 |

* cited by examiner

Primary Examiner—Thomas Lee
Assistant Examiner—Phuong N. Hoang
(74) Attorney, Agent, or Firm—Lerner, David, Littenberg, Krumholz & Mentlik, LLP

(57) ABSTRACT

The multi-processor system comprises a plurality of cell processors for performing data processing, a BCMC for broadcasting broadcast data including data used in data processing to the plurality of cell processors, each of the plurality of cell processors sorts out only data necessary for data processing that is performed by each cell processor from broadcast data broadcasted by BCMC to as to perform data processing. BCMC obtains results of data processing of all cell processors so that they can be supplied to all cell processors as broadcast data, thus making it possible to transmit and receive the results of data processing between the cell processors and perform high-speed data processing as an entire system.

11 Claims, 9 Drawing Sheets

MULTI-PROCESSOR SYSTEM, DATA PROCESSING SYSTEM, DATA PROCESSING METHOD, AND COMPUTER PROGRAM

CROSS-REFERENCE TO RELATED APPLICATIONS

This application is based upon and claims the benefit of priority from the prior Japanese Patent Applications Nos. 2000-294732, filed Sep. 27, 2000, and 2001-289588, filed Sep. 21, 2001, the entire contents of both of which are incorporated herein by reference.

BACKGROUND OF THE INVENTION

1. Field of the Invention

The present invention relates to a data processing system that performs data processing by a plurality of data processing means, for example, a multi-processor system and a data processing method.

2. Description of the Related Art

With advance in highly sophisticated information-oriented society, there is a growing tendency for amounts of data processing, which is performed by data processing apparatuses such as a computer and the like, to increase. Moreover, the contents of data processing have become complicated and highly advanced. Conventionally, the performance of processors such as CPU (Central Processing Unit) and the like are highly increased or a plurality of processors is converted into a multi-processor so as to improve the processing ability of the entire data processing apparatus.

However, in recent years, the speed at which the ability of data processing required is increased has reached the point that exceeds the speed at which the performance of processors is highly improved. The improvement in high performance of processors cannot be attained for a short time since much time is required for the development.

On the other hand, for example, the data processing ability of multi-processor is determined, depending on the number of processors to be used and the processing method; and dependence on the high performance of individual processors is low. For this reason, this is one of useful means to improve the processing ability of data processing apparatus.

The data processing method using the multi-processor can be explained as follows if it is divided based on the range of data necessary when one processor performs data processing.

(1) The processor that performs data processing uses only data processed by the adjacent connected processor.

Such control is suitable for a cell automaton, image filter, calculation of cloth-wave like movement, calculation of polygon generation from a curved surface and the like.

(2) The processor that performs data processing uses data processed by all processors.

Such control is suitable for an associative storage, optimization of four-color problem, traveling salesman problem and so on, radiosity, clustering, multiplexing link simulation, learning, etc.

(3) The processor that performs data processing uses only data processed by some of a plurality of processors.

Such control is suitable for self-assembly calculation, group algorithm based on judgment using sense of vision, many-to-many collision determination, database search, calculation for generating/deforming continuous curved surface, born animation, inverse kinematics, etc.

In the above case (1), data processing can be efficiently implemented by the conventional parallel processors. However, in the above cases (2) and (3), processing speed of the entire system is limited by communication speed between the parallel processors, so that processing speed of each processor cannot be satisfactorily exerted. For example, crossbar connection between all processors is established to make it possible to perform high-speed data processing of cases (2) and (3). In this case, however, an amount of necessary hardware becomes enormous, and this is not realistic.

SUMMARY OF THE INVENTION

It is an object of the present invention is to provide various kinds of multi-processor systems, a data processing system, a data processing method, a computer program, and a semiconductor device.

In order to solve the aforementioned problems, the present invention provides various kinds of multi-processor systems described below, a data processing system, a data processing method, a computer program, and a semiconductor device.

A first multi-processor system comprises a plurality of processors for performing data processing; and a controller for broadcasting broadcast data including data used in data processing to the plurality of processors, wherein each of the plurality of processors sorts out data necessary for data processing to be performed by each processor from the broadcast data broadcasted by the controller to perform data processing.

In such multi-processor system, since each of the plurality of processors sorts out only data that is necessary for each cell from broadcasted data and performs data processing, it is possible to implement high-speed processing without occurrence of a data conflict.

In the case where each processor can use or refer to the processing results from the other processors, the controller obtains a result of processing from each of the plurality processors, and broadcasts the obtained result of processing to all processors as broadcast data.

Preferably, each of the plurality of processors is assigned identification data for identifying the corresponding processor, the controller generates broadcast data where identification data of the processor as a result obtaining source is added to the result of processing and broadcasts the data. Accordingly, each processor can easily sort out the result of processing necessary for data processing that each processor should perform at next timing based on the identification data. Moreover, each processor can easily recognize from which processor the broadcasted processing result has been sent.

When there is a possibility that the conflict of the plurality of processors that has finished data processing will occur, there is provided the multi-processor system further comprising a sort mechanism obtains the identification data from the processor that has finished data processing among the plurality of processors to send obtained identification data to the controller in a given sequence. Then, the controller is configured to obtain the result of processing based on identification data received from the sort mechanism. In this case, there is further provided means for generating priority data that fixes a reading sequence of the result of processing to be performed by the controller. The processor that has finished data processing is configured to send the sort mechanism identification data of the processor and the priority data about the processing, the sort mechanism is configured to determine a sequence of sending the identification data based on the priority data, For example, in the case where the sequence of processing is determined as the entirety of multi-processor system, the provision of sort mechanism allows the controller to obtain the processing result in the necessary sequence and efficiently execute the complicated processing as an entirety of system.

The sort mechanism includes the same number of registers as the processors, means for recording the identification data and identification data sent from the respective processors in the register relating to the corresponding processor, a comparator for performing a comparison between the priority data to determine sequence of identification data recorded in the respective registers. The sort mechanism is configured to determine the sequence of sending the identification data based on the determination result of the comparator.

The controller in the multi-processor system includes, for example, memory for storing data, storage control means for obtaining the result of processing from the processor specified by the identification data received from the sort mechanism to store the obtained result in the memory, and data generating means for reading the result of processing stored in the memory to generate the broadcast data that includes the result of processing and the received indemnification data, whereby allowing the implement of the multi-processor system.

Moreover, each of the plurality of processors more specifically includes a data processing mechanism for determining whether or not data necessary for data processing that is performed by each processor is included in the broadcast data to sort out only the data when the necessary data is included therein and perform data processing, means for sending the controller the result of data processing performed by the data processing mechanism and identification of each processor according to a request from the controller, and means for sending the sort mechanism process end notifying data including identification data of each processor when ending data processing, whereby allowing the implement of the multi-processor system.

A second multi-processor system comprising a plurality of processors for each holding template data to be compared with data to be input, a controller for broadcasting the input data to the plurality of processors, and a comparison mechanism for comparing the respective outputs of the plurality of processors. Template data held by the plurality of processors is different from template data held by other processors, respectively. Each of the plurality of processors calculates a differential value between the feature of the input data broadcasted by the controller and the feature of the template that is held by each processor and sends the comparison mechanism a pair of data including the calculated differential value and identification data for identifying each processor. The comparison mechanism selects any one of differential values based on the differential values received from the respective processors and sends the controller identification data paired with the selected differential value. The controller specifies one processor from the plurality of processors based on the identification data received from the comparison mechanism.

The above-configured multi-processor system can perform judgment of similarity of data at high-speed.

A third multi-processor system comprises a plurality of processors for performing data processing, a controller for broadcasting data used in data processing to the plurality of processors, and a sum circuit for calculating the sum of results of data processing performed by the plurality of processors. Each of the plurality of processors sorts out only data necessary for processing from the data broadcasted by the controller to perform data processing and sends the result of processing to the sum circuit. The sum circuit calculates the sum of the results of processing sent from the respective processors and sends the calculation result to the controller. The controller broadcasts the sum of the results of processing received from the sum circuit to the plurality of processors.

The sum of the data processing results is often needed to normalize the calculation in connection with an optimization calculation used in such as a neurocomputer. The calculated sum may be broadcasted to each processor. The above-configured multi-processor system can perform these processing at high-speed.

Additionally, in each of the above multi-processor systems, at least some of the plurality of processors are connected to each other in a ring format via common memory, and are configured such that transmission/reception of data between the processors connected in a ring format is performed via the common memory.

The data processing method provided by the present invention is the method, which is executed by an apparatus or a system having a plurality of data processing means each which performs data processing, and control means for controlling an operation of each of the plurality of data processing means, the method comprising the steps of obtaining a result of data processing in a given order in which data processing was performed by each of the plurality of processors to generate broadcast data including the obtained result of processing and identification data for identifying data processing means as a processing result obtaining source and broadcast the broadcast data to the plurality of data processing means, wherein the step is performed by the control means; and selecting only some of the processing results specified based on the identification data from broadcast data received by the control means to perform data processing and send the control means the result of processing and identification data indicating each data processing means, wherein the step is performed by at least one of the plurality of data processing means.

The first data processing system provided by the present invention comprises a plurality of data processing means for performing data processing, and control means for broadcasting broadcast data including results of data processing received from some or all of the plurality of data processing means and data used in data processing performed by at least one of the data processing means, wherein each of the plurality of data processing means sorts out only data necessary for data processing to be performed by each data processing means from the broadcast data broadcasted by the control means to perform data processing and sends the processing result to the control means.

The second data processing system is one that performs two-way communication between a plurality of data processing means that performs data processing, the data processing system comprising means for specifying at least one the data processing means to generate broadcast data including identification information of the specified data processing means and data processing data directed to the data processing means, means for obtaining a result of data processing performed by the corresponding data processing means from some or all of the plurality of data processing means, and means for including the processing result received in the broadcast data to broadcast the broadcast data to each of the plurality of data processing means.

The computer program provided by the present invention is one for causing an apparatus having a computer that performs two-way communication between a plurality of data processing means that performs data processing to form the following functions (1) to (3) and the semiconductor device provided by the present invention is one that is incorporated into an apparatus having a computer that performs two-way communication between a plurality of data processing means that performs data processing, whereby causing the computer to form the following functions (1) to (3).

Namely, they are functions of:

(1) specifying at least one the data processing means to generate broadcast data including identification information of the specified data processing means and data processing data directed to the data processing means;

(2) obtaining a result of data processing performed by the corresponding data processing means from some or all of the plurality of data processing means; and (3) including the processing result received in the broadcast data to broadcast the broadcast data to each of the plurality of data processing means.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Embodiments of the present invention will be specifically described with reference to the drawings accompanying herewith.

The following will explain the embodiment in which the present invention is applied to a multi-processor system as an example of data processing system.

<Entire Configurations>

Figure 1:
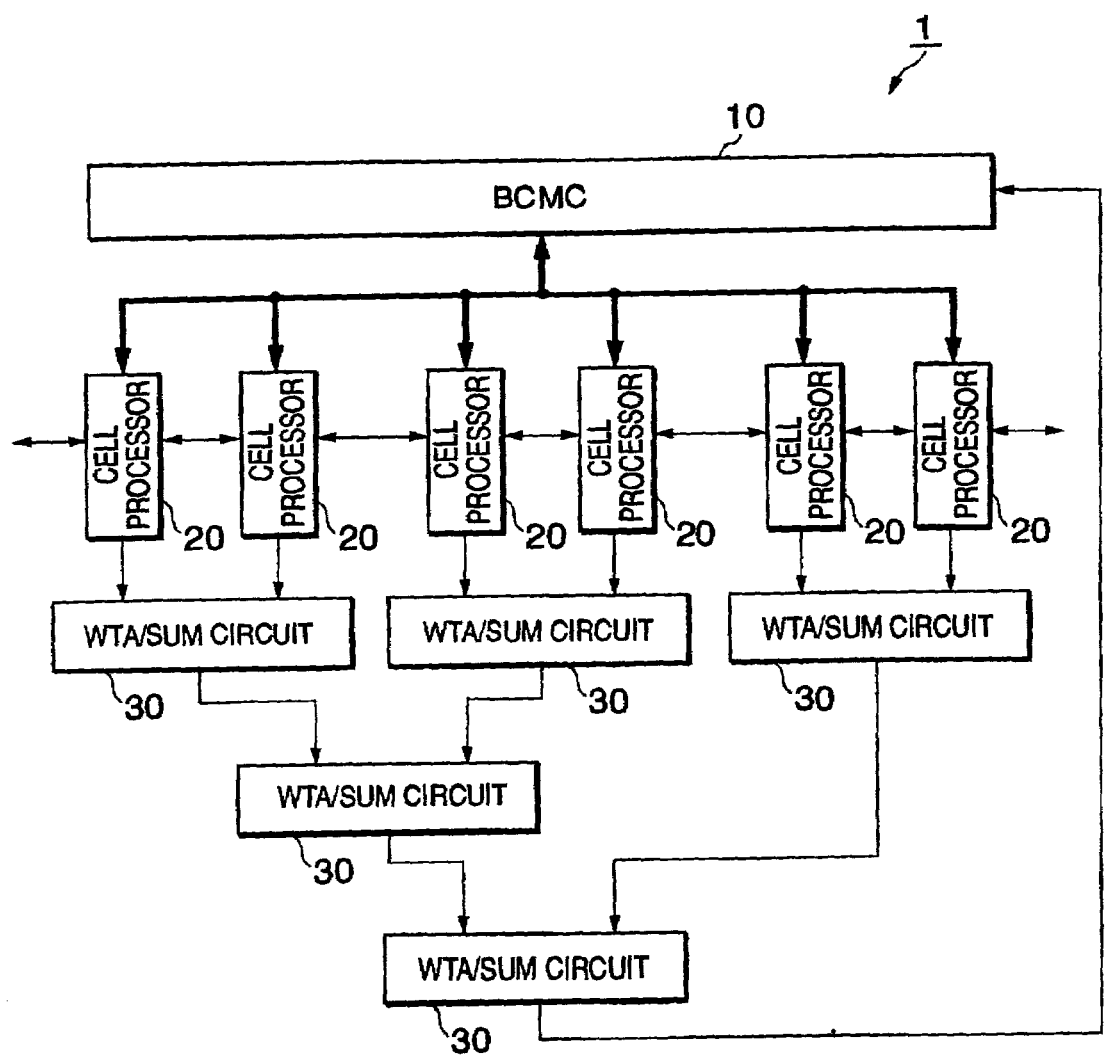
FIG. 1 is a view illustrating the configuration example of multi-processor system to which the present invention is applied.

FIG. 1 is a view illustrating the configuration example of multi-processor system. This multi-processor system 1 includes a broadcast memory controller 10 (hereinafter referred to as BCMC), which is control means for data processing and data recording and reading, a plurality of cell processors 20 as one example of each data processing means, a plurality of WTA (Winner Take All)/sum circuits 30 for forming various kinds of functions required for data processing.

BCMC and all processors 20 are connected via a broadcast channel (communication channel that can disseminate information to several recipients simultaneously).

This multi-processor system 1 manages a status variable value, which is the result of data processing obtained by each cell processor 20, using BCMC 10, and sends the status variable values of all cell processors 20 from BCMC 10 through the broadcast as one example of reference numeric values. This makes it possible for each cell processor 20 to refer to the status variable values generated by other cell processors 20 at high speed.

The broadcast channel is a transmission path formed between BCMC 10 and the plurality of cell processors 20, and includes an address bus that is used to transfer addresses and a data bus that is used to transfer data such as status variable values. The address includes a cell address for specifying each cell processor 20 and a broadcast address for all cell processors 20.

The cell address corresponds to an address (physical address or logical address) on memory, and the status variable value sent from the cell processor 20 is designed to be placed into memory at an address corresponding to a cell address indicative of each cell processor 20. Each processor 20 is provided with ID (identification) as identification information for identifying each cell processor. The cell address also corresponds to ID. The use of cell address makes it possible to specify from which cell processor 20 the status variable value is output.

The WTA/sum circuits 30 are connected as illustrated in FIG. 1. Namely, the WTA/sum circuits 30 are connected in a pyramidal shape where the side of the cell processors 20 is set as a first stage. Two cell processors 20 are connected to the input terminals of the respective WTA/sum circuits 30 of the first stage, and their output terminals are connected to the input terminals of the WTA/sum circuits 30 of the second stage.

In the second stage and afterward, the outputs of two WTA/sum circuits 30 of the lower stage are connected to the respective input terminals, and the input terminal of the WTA/sum circuits 30 of the upper stage is connected to the output terminal of the lower stage. The outputs of two WTA/sum circuits 30 of the lower stage are connected to the input terminals of the WTA/sum circuit 30 of the uppermost stage, and the output terminal of the WTA/sum circuit 30 of the uppermost stage is connected to BCMC 10.

In addition to the connection form illustrated above, the prevent invention can be carried out by cascading the WTA/sum circuits 30. In this case, two cell processors 20 are connected to the input of the WAT/sum circuit 30 of the first stage, and its output terminal is connected to the input terminal of the upper stage. The output terminals of the WTA/sum circuits 30 of the lower stage and the cell processors are connected to the input terminals of the WTA/sum circuits 30 of the second stage and afterward. The output terminals of the WTA/sum circuits 30 of the second stage and afterward are connected to the input terminal of the upper stage. The input terminal of the WTA/sum circuit 30 of the uppermost stage is connected to the output terminal of the WTA circuit 30 of the lower stage and the cell processor 20, and the output terminal of the WTA/sum circuit 30 of the uppermost stage is connected to the BCMC 10.

An explanation will be next given of each of BCMC 10, cell processor 20, WTA/sum 30 in detail.

<BCMC>

Figure 2:
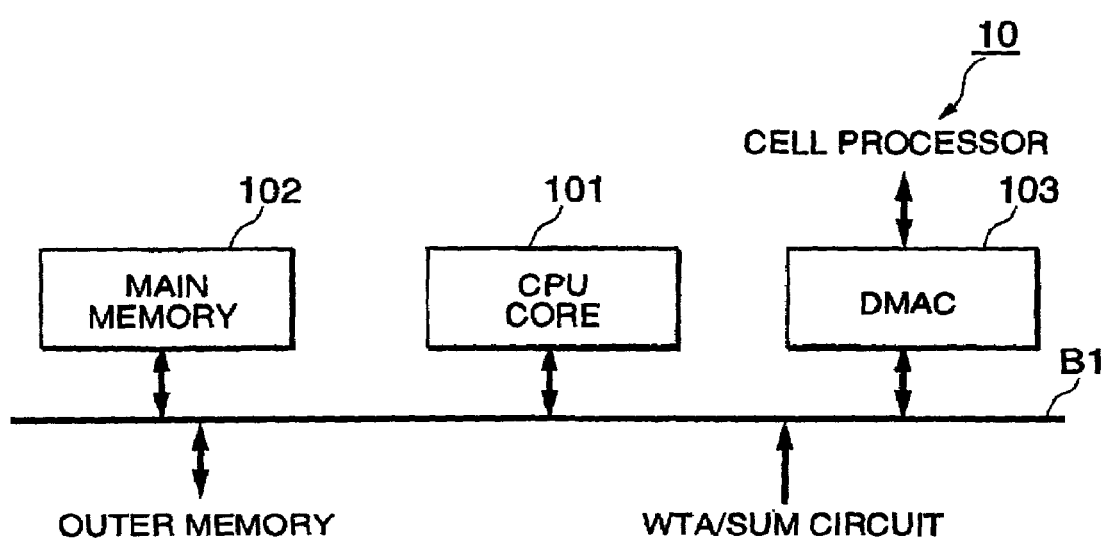
FIG. 2 is a view illustrating the configuration example of a BCMC according to the present invention.

BCMC 10 broadcasts data to all cell processors 20 through the broadcast channel, and fetches the status variable values from the respective cell processors 20 and holds them. A configuration example of BCMC 10 is illustrated in FIG. 2.

The BCMC 10 includes a CPU core 101 that controls the entire operation of the multi-processor system 1, main memory 102 that can rewrite SRAM (Static Random Access Memory), and a DMAC (Direct Memory Access Controller) 103 and they are connected to one another by a bus B1. The CPU core 101 is a semiconductor device including a computer having a function for performing the characteristic data processing of the present invention by reading a given computer program in cooperation with main memory 102 to execute the program. The main memory 102 is used as memory common to the entire system.

The output terminal of the WTA/sum circuit 30 of the, uppermost stage and outer memory such as hard disk, transportable media, and like are also connected to the bus B1.

The CPU core 101 reads a startup program from the external memory at an initiating time, and executes the startup program to operate an operating system. It also reads various kinds of data necessary for data processing from the external memory and expands it to the main memory 102. Data such as a status variable value of each cell processors 20 is designed to be stored in the main memory 102. The status variable value is placed into the main memory at the address corresponding to the cell address of the cell processor 20 that has calculated the corresponding status variable value.

The CPU core 101 generates broadcast data to be broadcasted to each cell processor 20 based on data read from the main memory 102. The broadcast data is a pair of data having a status variable value and a cell address indicating the cell processor 20 that has calculated the corresponding status variable value. In this case, one or a plurality of pairs of data is generated.

The DMAC 103 is a semiconductor device that performs direct memory access transfer control between the main memory 102 and each cell processor 20. For example, the TDMAC 103 broadcasts broadcast data to each cell processor 20 via the broadcast channel. It also obtains the results of data processing of the respective cell processors 20 individually and writes them to the main memory 102.

<Cell Processors>

Figure 3:
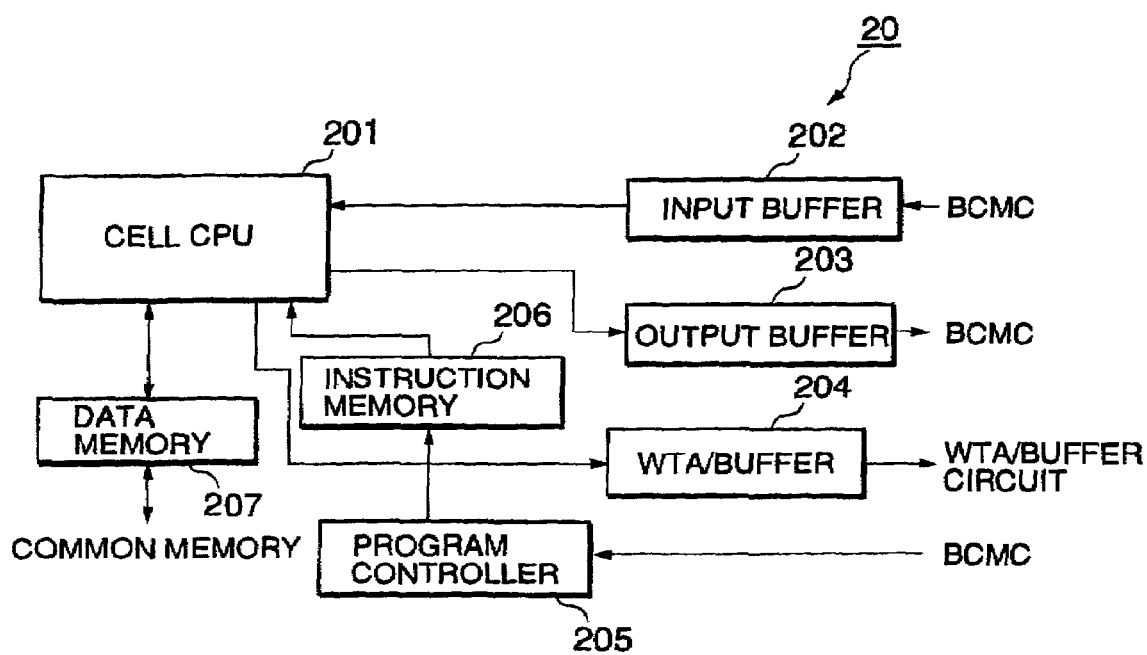
FIG. 3 is a view illustrating the configuration example of a cell processor according to the present invention.

Each cell processor 20 sorts out necessary data from broadcast data and performs data processing, and reports the result to the WTA/sum circuit 30 at the time of ending data processing. Each cell processor 20 sends the status variable value, which is the result of data processing, to the BCMC 10 in accordance with an instruction from the BCMC 10. The respective cell processors 20 are connected to each other in a ring format via the common memory (not shown). Each cell processor 20 may perform data processing on a synchronous clock. Also, each cell processor 20 may perform data processing on a different clock. FIG. 3 shows the configuration example of the cell processor 20.

The cell processor 20 is composed of a cell CPU 201, an input buffer 202, an output buffer 203, a WTA buffer 204, a program controller 205, instruction memory 206, and data memory 207.

The cell CPU 201 is a processor that has a programmable floating-point calculator and controls the operation of each cell processor to perform data processing. The cell CPU 201 obtains broadcast data subjected to broadcasting from the BCMC 10 via the input buffer 202. Then, the cell CPU 201 determines whether or not obtained broadcast data is data necessary for processing that the cell CPU 201 should perform using the cell address of pair data. The cell CPU 201 writes the status variable value to the corresponding address of data memory 207, if necessary. Moreover, the cell CPU 201reads the status variable value from the data memory 207 and performs data processing. Then, the cell CPU 201 writes the result of data processing to the output buffer 203, and sends data, which indicated the end of data processing, to the WTA/sum circuit 30.

The input buffer 202 is one that holds broadcast data subjected to broadcasting from the BCMC 10. Broadcast data held is sent to the cell CPU 201 in response to a request sent from the cell CPU 201.

The output buffer 203 is one that holds the status variable value of the cell CPU 201. The status variable value held is sent to the BCMC 10 in response to a request from the BCMC 10. In addition to the above, the input buffer 202 and output buffer 203 may perform transmission and reception of data for control.

The WTA buffer 204 receives data, which indicates the end of data processing, from the cell CPU 201 at the time of ending data processing performed by the cell CPU 201. Then, the WTA buffer 204 transmits the received data to the WTA/sum circuit 30 to report the end of data processing thereto. Data, indicative of end of data processing, includes, for example, ID of its cell processor 20, and priority data that determines priority, which is necessary when the status variable value stored in the output buffer 203 is read to the BCMC 10.

The program controller 205 is one that fetches a program for defining the operation of the cell processor 20 from the BCMC 10. The program for defining the operation of the cell processor 20 includes a program for data processing executed by the cell processor 20, a data selective program for determining data necessary for processing executed by each cell processor 20. The program also includes a priority deciding program for deciding priority, which is necessary when the result of processing is read to the BCMC 10.

The instruction memory 206 stores the program fetched by the program controller 205. The stored program is read to the cell CPU 201 as required.

The data memory 207 is one that stores data processed by the cell processor 20. The broadcast data determined as being necessary by the cell CPU 201 is written therein. The broadcast data is stored into the data memory 207 at the address corresponding to the cell address.

Furthermore, according to this embodiment, a part of the data memory 207 is connected to the cell processors 20 adjacent to each other via the common memory to make it possible to transmit/receive data to/from the adjacent cell processors for each cycle.

<WTA/Sum Circuit>

The plurality of WTA/sum circuits 30 determines the order in which the BCMC 10 captures the status variable value from the cell processor 20 based on data, indicative of the end of data processing sent from each cell processor 20, and reports it to the BCMC 10.

Figure 4:
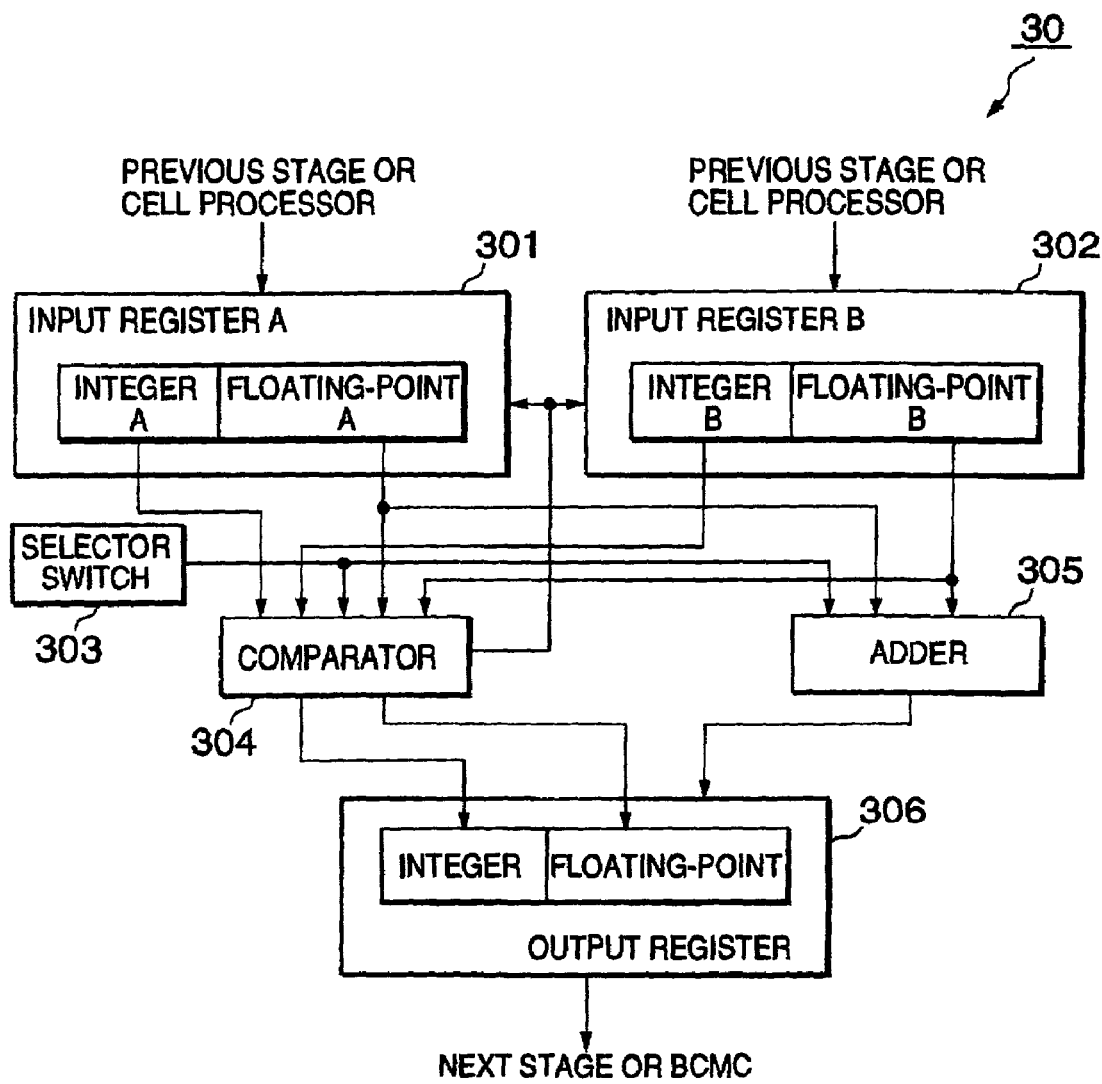
FIG. 4 is a view illustrating the configuration example of a WTA/sum circuit according to the present invention.

FIG. 4 illustrates the configuration example of the WTA/sum circuit 30.

Each WTA/sum circuit 30 is composed of two input registers A and B (hereinafter referred to first input register 301 and second input register 302), a selector switch 303, a comparator 304, an adder 305, and an output register 306.

Each of the first input register 301 and the second input register 302 has an integer register and a floating-point register. Among data, indicative of the end of data processing sent from each cell processor 20, for example, ID data is written into the integer register, and priority data is written into the floating-point register.

The selector switch 303 energizes either the comparator 304 or the adder 305. More specifically, the selector switch 303 makes it possible to use only one of them in accordance with an operation mode. The operation mode is determined by an instruction from, e.g., the BCMC 10. The operation mode will be described later.

The comparator 304 perform's the comparison of the floating-point values, which are held by the floating-point registers of the first input register 301 and second input register 302. The comparator 304 writes a larger (or smaller) value and an integer attendant thereon to the output register 306.

The adder 305 calculates the sum of the floating-point values, which are held by the floating-point registers of the first input register 301 and second input register 302, and writes the result of calculation to the output register 306.

The output register 306 is configured in substantially the same way as the fist input register 301 and the second input register 302. Namely, the output register 306 comprises the integer register and the floating-point register. ID data is written to the integer register and priority data is written to the floating-point register.

The WTA/sum circuit 30 has three operation modes set forth below.

Maximum Value (WTA) Mode:

The comparator 304 is energized by the selector switch 303. The comparator 304 performs the comparison of the floating-point values A and B, which are held by the floating-point registers of the first input register 301 and second input register 302. The comparator 304 writes a larger (or smaller) value and an integer attendant thereon to the output register 306. When the writing to the output register 306 is ended, the first input register 301 and the second input register 302 are cleared.

The content of the output register 306 is written to the input register of the WTA/sum circuit 30 of the upper stage. At this time, if the input register as a writing destination is not cleared, the writing is stalled and no writing is performed at this cycle. For this reason, the content of the output register 306 is designed to be written at a next cycle.

Addition Mode:

The adder 305 is energized by the selector switch 303. The adder 305 calculates the sum of the floating-point values A and B, which are held by the floating-point registers of the first input register 301 and second input register 302. Then, the adder 305 writes the calculation result to the output register 306. The content of the output register 306 is written to the input register of the WTA/sum circuit 30 of the upper stage.

Approximate Sort Mode:

The comparator 304 is energized by the selector switch 303. The comparator 304 performs the comparison of the floating-point values A and B, which are held by the floating-point registers of the first input register 301 and second input register 302. The comparator 304 writes a larger (or smaller) value and an integer attendant thereon to the output register 306.

Thereafter, only the input register, which holds the value written in the output register 306, is cleared. The content of the output register 306 is written to the input register of the WTA/sum circuit 30 of the upper stage. If the input register as a writing destination is not cleared, the writing is stalled and no writing is performed at this cycle. In addition, the writing operation from the output register 306 of the WTA/sum circuit 30 of the lower stage is performed.

By the approximate sort mode, data, which the BCMC 10 receives from the WTA/sum circuit 30 of the uppermost stage, is sorted in order of increasing or decreasing the floating-point values.

Additionally, the first input registers 301, second input registers 302, and output registers 306 of all WTA/sum circuits 30 are cleared before entering each mode.

The change in each mode implements the function as a mechanism for sorting (sorting mechanism) and/or sum circuit in connection with the entirety of the plurality of WTA/sum circuits. In other words, the operation in the approximate sort mode realizes the sorting mechanism, and the operation in the addition mode realizes the sum circuit.

The WTA/sum circuit 30 that operates in each of the maximum value mode and the approximate sort mode may be realized as follows:

Namely, WTA/sum circuit 30 is composed of the same number of input registers as that of the cell processors 20, a selector switch, comparator 304, adder 305, and output register.

The number of input registers as that of the cell processors 20 is prepared, and each includes an integer register and a floating-point register similar to the first register 301 and second register 302. The comparator performs the comparison of the floating-point values, which are held by the floating-point registers of all input registers. The adder calculates the sum of the floating-point values, which are held by all floating-point registers.

The output register is the same as the output register of the WTA/sum 30 of FIG. 4.

The comparator compares priority data that is held by the floating-point registers of the respective input registers and writes appurtenant IDs to the output register in decreasing order of priority, sequentially. This makes it possible to send IDs to the BCMC 10 in decreasing order of priority.

The adder adds data that is held by the floating-point registers to obtain the total sum.

Such one WTA/sum circuit functions as the sorting mechanism and sum circuit of the present invention instead of adopting the connection form as illustrated in FIG. 1.

<Data Processing Method>

Figure 5:
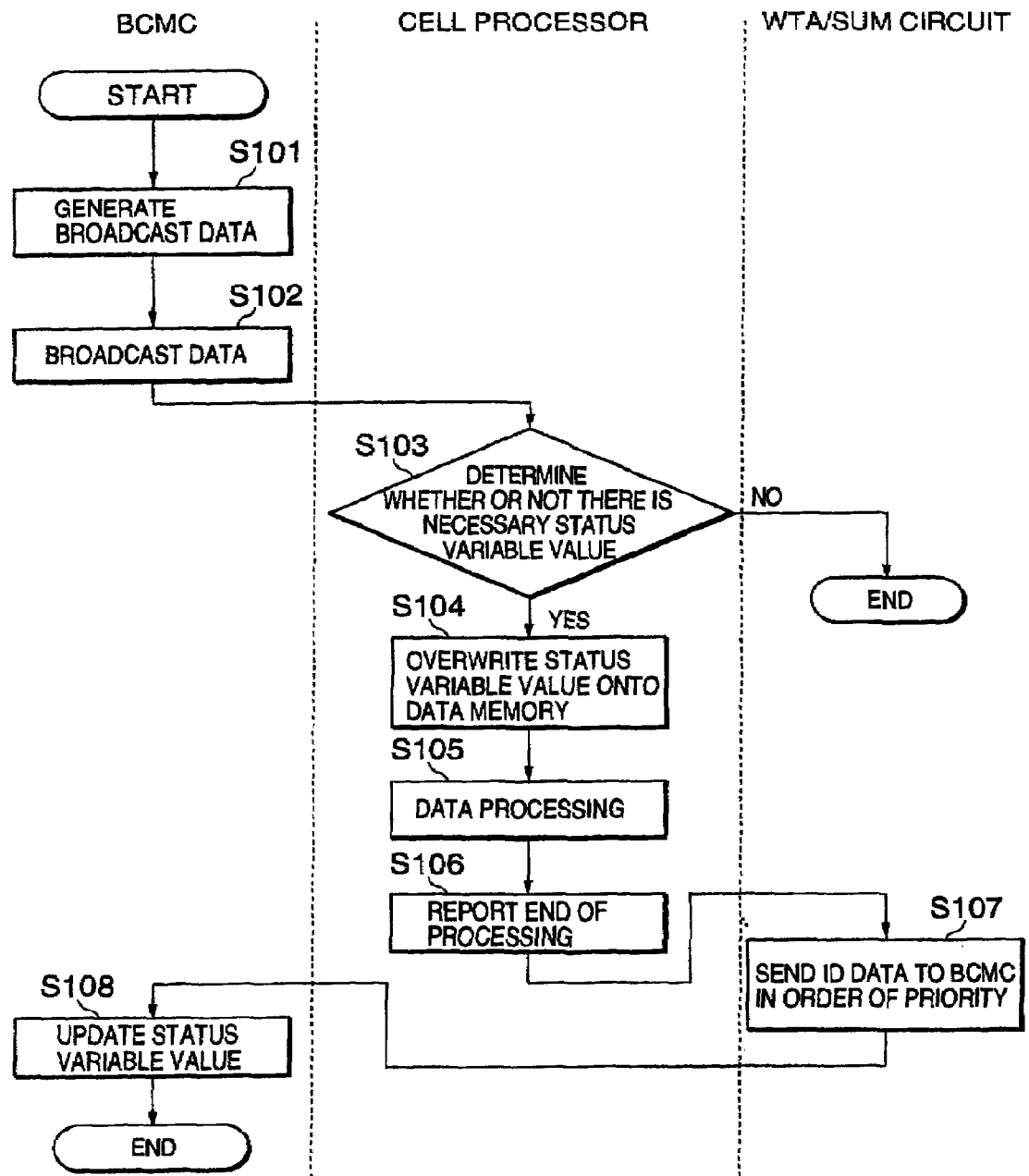
FIG. 5 is a flowchart illustrating the flow of processing that is executed by the multi-processor system according to the present embodiment.

The multi-processor system 1 of the present embodiment performs the following operation to execute a required data processing. FIG. 5 is a flowchart illustrating the flow of processing that is executed by this multi-processor system 1.

In the main memory 102 of BCMC 10, initial values of status variable values of all cell processors 20 are stored in advance.

BCMC 10 produces broadcast data using a pair of data including the status variable value of each cell processor 20 and the cell address of each cell processor 20 (step S101). Then, BCMC 10 broadcasts produced broadcast data to all cell processors 20 (step S102).

Each cell processor 20 fetches broadcast data to the input buffer 202. The cell CPU 201 checks the cell address of broadcast data held by the input buffer 202 according to a data selection program stored in the instruction memory 206, and confirms whether or not there is a status variable value that is needed when each cell processor 20 performs data processing (step S103). In the case where there is no status variable value that is needed when each cell processor 20 performs data processing, the cell processor 20 ends the processing operation (step S103: NO). In the case where there is a status variable value that is needed when each cell processor 20 performs data processing (step S103: YES), the cell processor 20 performs the overwriting of the corresponding status variable value at the address on the data memory 207 corresponding to the cell address paired with this status variable value (step S104).

In this way, broadcasting of data to each cell processor 20 from BCMC 10 is ended.

When the broadcasting is ended, each cell processor 20 provides data processing to the status variable value recorded on the data memory 207 to produce a new status variable value according to the program of data processing stored in the instruction memory 206. The new status variable value is written to the data memory 207, and is written to the output buffer 203, too (step S105). Then, each cell processor 20 performs the overwriting of the new status variable value at the address on the data memory 207 corresponding to its cell address.

When data processing is ended, the cell CPU 201 transmits end data including ID and priority data to the input register of the WTA/sum circuit 30 of the first stage via the WTA buffer 204, and reports the end of data processing (step S106). Priority data is generated according to a given priority deciding program before or after data processing.

In connection with end data sent from each cell processor 20, the WTA/sum circuit 30 of the first stage holds ID by use of the integer registers of input register and priority data by use of the floating-point registers, respectively. Here, the WTA/sum circuit 30 operates in the approximate sort mode. For this reason, the selector switch 303 energizes the comparator 304.

The integer registers of the first input register 301 and second input register 302 of WTA/sum circuit 30 hold IDs sent from the different processors. Each of the floating-point registers holds priority data attendant on ID. The comparator 304 reads priority data from the floating-point registers of the first input register 301 and the second input register 302, and compares them. As a result of comparison, the comparator 304 writes higher priority data and IDs attendant thereon to the floating-point register of the output register 306 and the integer register. Regarding the input registers whose contents are written to the output register 306, the contents are cleared. Regarding IDs and priority data written to the output register 306, they are written to the input registers of the WTA/sum circuit 30 of the upper stage.

The aforementioned processing is performed at the WTA/sum circuits of the respective stages. The TWA/sum circuit 30 of the uppermost stage sends ID written to the inter register of the output register 306 to BCMC 10.

The WTA/sum circuits 30 as a whole send IDs to the BCMC 10 in order of decreasing the priority by the aforementioned processing (step S107).

The BCMC 10 obtains a status variable value subjected to data processing from the output buffer 203 of the cell processor 20 corresponding to ID sent from the WTA/sum circuit 30. The overwriting of the obtained status variable value is performed at the address corresponding to the cell address indicating the cell processor 20 that has performed processing (step S108).

In this way, one cycle of operation for processing the status variable value is ended.

The BCMC 10 obtains the result of data processing from each cell processor 20, thus generating broadcast data.

Each cell processor 20 sorts out only data necessary for each cell processor 20 from broadcast data to perform data processing. Data processing using such broadcast data makes it possible to perform processing using data processed by all other cell processors 20. Moreover, the BCMC 10 generates broadcast data using the pair of data having the result of data processing sent from each cell processor 20 and the cell address indicative of the cell processor 20 that has generated the result of data processing. This makes it possible to perform processing using only the result of data processing sent from the specific cell processor 20. Moreover, since the adjacent cell processor 20 are connected to each other via the common memory, it is possible to perform processing between the adjacent cell processors 20, similar to the prior art.

Each cell processor 20 sorts out necessary data from broadcast data without fetching data necessary for each cell processor 20 to the main memory 102 directly, and performs processing as holding data therein, allowing high-speed processing without occurrence of a data conflict.

[First Embodiment]

A specific explanation will be next given of a first embodiment of the above-explained multi-processor system 1.

Figure 6:
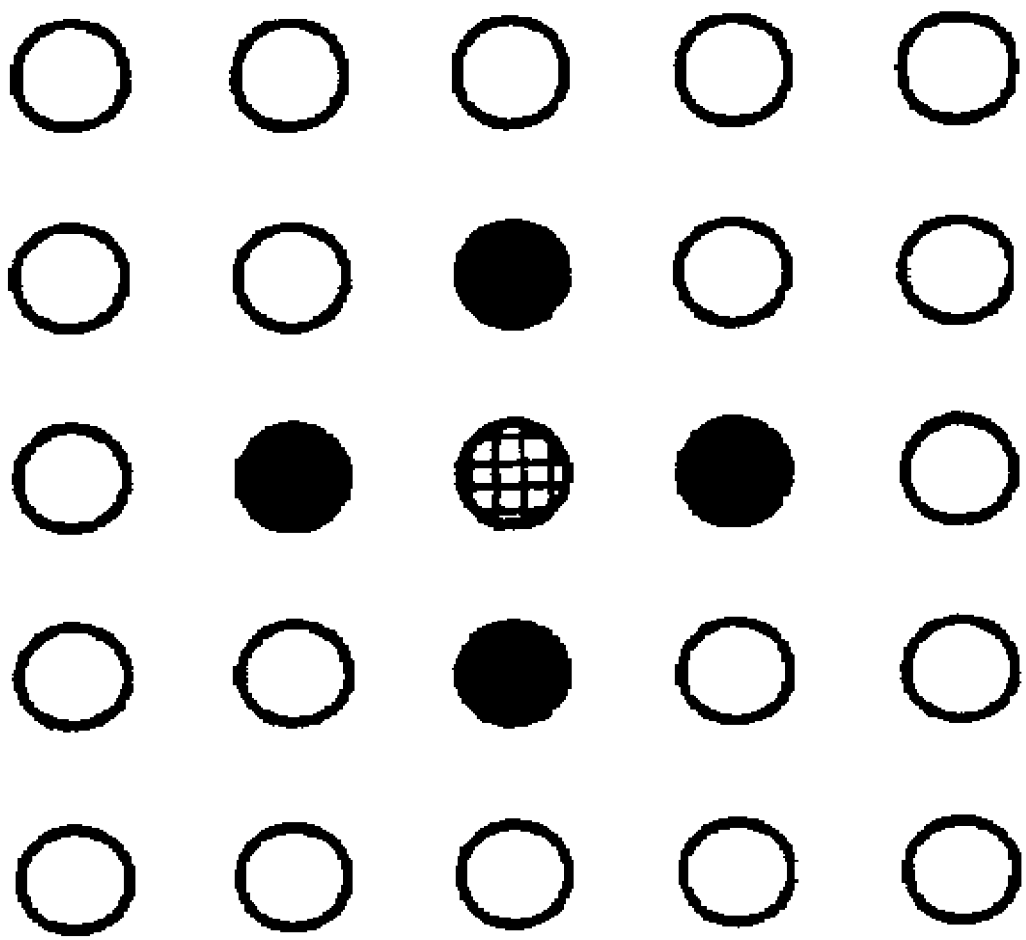
FIG. 6 is a conceptual view using the result of data processing of an adjacent processor according to the present invention.

This embodiment explains an example using only data processed by a certain cell processor 20 and other cell processors 20 adjacent thereto with reference to FIG. 6.

In FIG. 6, "○" represents cell processors and a shaded "○" indicates a cell processor that performs data processing, and "●" denotes cell processors that hold necessary data.

It is assumed that the following filter calculation is continuously executed relative to data (lattice point data) about each lattice point of n×n lattices (n is a natural number of two or more).

$$Xi,j=(Xi-1,j+Xi+1,j+Xi, j-Xi, j+1)/4$$

where i: row number of lattice point, j=column number of lattice point.

BCMC 10 broadcasts lattice point data, which is grouped in a row or column as broadcast data, to n cell processors 20.

Figure 8:
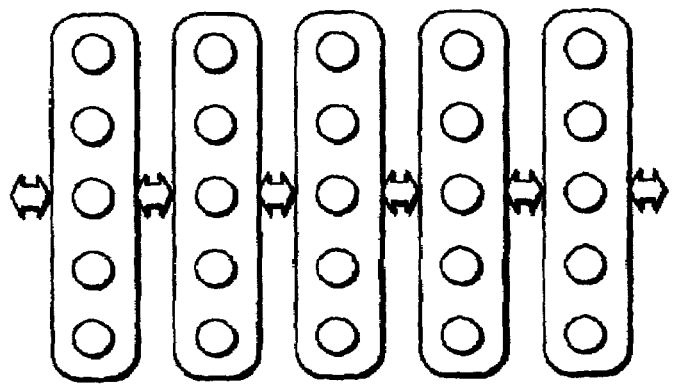
FIG. 8 is a view illustrating a case in which lattice point data is grouped according to the present invention.

FIG. 8 is a view illustrating lattice data, which is grouped. Lattice point data indicated by "○" is illustrated in groups of five. Lattice point data in one group is processed by one cell processor 20.

The cell processor 20 stores necessary lattice point data grouped from broadcast data in the data memory 207. Then, it reads lattice point data from the data memory 207 sequentially and performs data processing. Data transfer between the cell processors 20 connected via the common memory is performed using the common memory. If data writing operation to the common memory is one cycle, transfer of grouped data between the cell processors 20 can be carried out in 2 n cycles.

The respective cell processors 20 are synchronously operated to execute the writing to the common memory and the calculation simultaneously as in pipeline processing, making it possible to perform communication between the cell processors and the calculation at the same time.

The BCMC 10 broadcasts next broadcast data each time when data processing of grouped lattice data is ended. The cell processor 20 judges whether or not data processing should be carried out based on data I and j to be broadcasted.

Broadcast data is grouped to make it possible to process data in a row or column direction, and data transfer is performed via common data, allowing data processing in a row or column direction.

[Second Embodiment]

Figure 7:
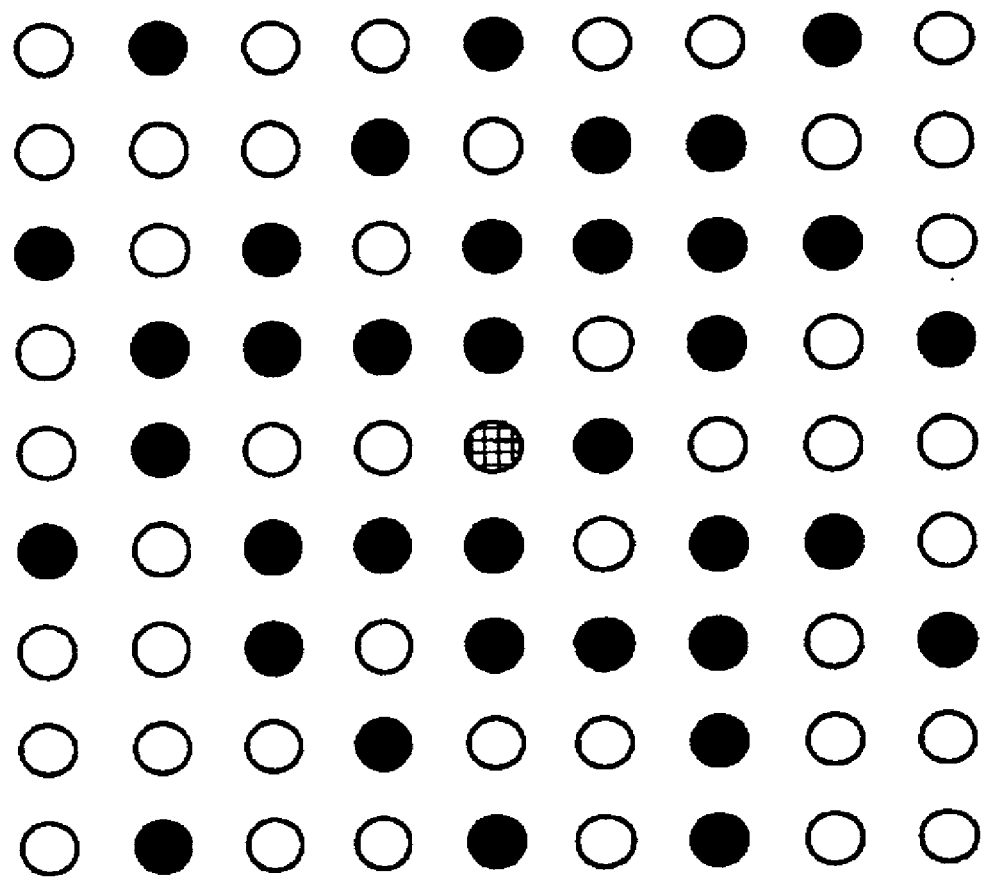
FIG. 7 is a conceptual view using the result of data processing of some processors according to the present invention.

This embodiment explains an example using only data processed by some of all cell processors 20 with reference to FIG. 7. In FIG. 7, "○" represents cell processors and a shaded "○" indicates a cell processor that performs data processing, and "●" denotes cell processors that hold necessary data. Such a multi-processor system is useful to realize hop field associative storage.

It is assumed that each cell processor 20 holds a status variable value, which is the result of data processing, and a weighting factor indicative of significance of the status variable data. Moreover, a number is added to each of the cell processors 20, and the BCMC 10 fetches the status variable values from all cell processors 20 in order of the number.

The BCMC 10 broadcasts the status variable values fetched from all cell processors 20 as broadcast data. Each cell processor 20 selects only necessary status variable value from broadcast data and performs product-sum operation with respect to the weighting factor and updates the status variable value. In the case where necessary status variable value indicates all status variable values included in broadcast data, this corresponds to processing using data processed by all processors.

[Third Embodiment]

An explanation will be next given of an example of pattern matching calculation processing.

Here, processing for specifying the cell processor 20 that holds data, which is similar to the feature of input data most, is performed. This processing is carried out as follows:

Each cell processor 20 holds template data to be compared beforehand.

The BCMC 10 broadcasts input data to all cell processors 20. Each processor 20 calculates a differential value between the feature of template data held by each cell processor 20 and the feature of input data. The differential value is sent to the WTA/sum circuit 30 with ID.

The WTA/sum circuit 30 operates in the maximum value mode. The integer register of input register holds ID, and the floating-point register holds the differential value. The comparator 304 compares the differential values calculated by the respective cell processors 20, and sends a smaller differential value and ID attendant thereon to the output register 306. This processing is carried out through the entire WTA/sum circuits 30 to obtain the smallest differential value and ID attendant thereon. The obtained ID and differential value are sent to the BCMC 10.

The BCMC 10 specifies the cell processor 20 based on ID. This make it possible to detect template data which is similar to the feature of the input data most, and to detect the differential value between the template data and the input data.

[Fourth Embodiment]

An explanation will be next given of an example of collision determination algorithm processing of moving objects used in image processing. "collision determination algorithm" is one that determines whether or not n objects existing in a certain space collide with other objects and how much degree of strength is generated when collision occurs.

There are some variations in the spatial distribution of n objects, and the objects are divided into m clusters. Here, for example, it is assumed that determination of whether one object collides with any one of other (n-1) objects most strongly is performed.

Figure 9:
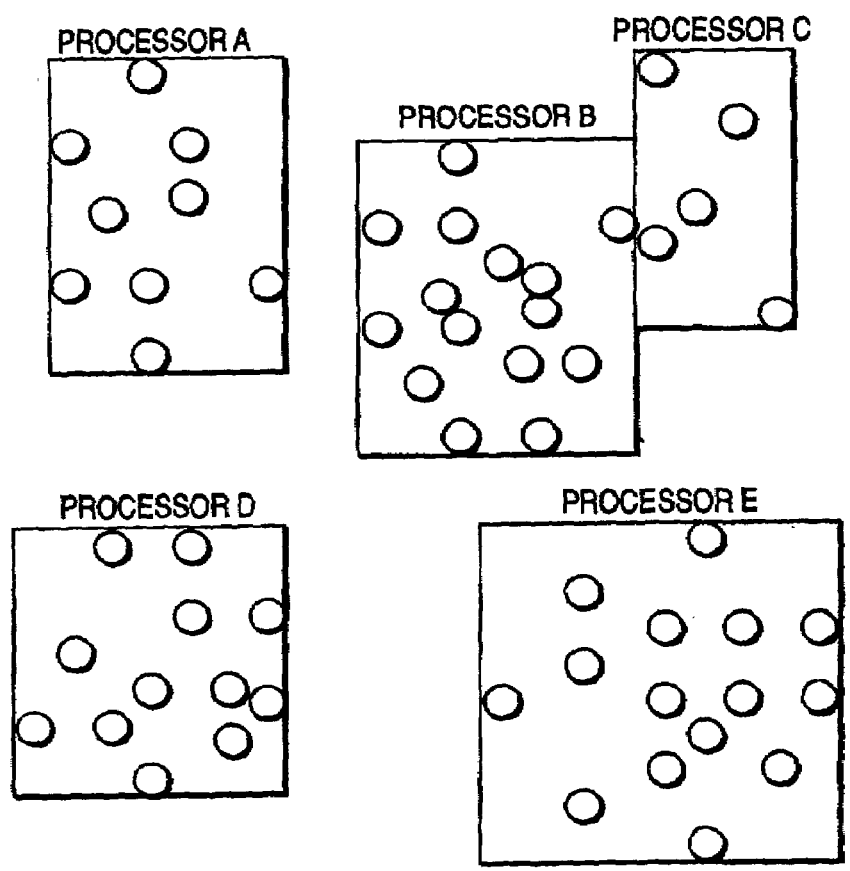
FIG. 9 is a view illustrating a case in which objects are divided into clusters according to the present invention.

FIG. 9 is a view illustrating the objects in such a space, and objects expressed by "○" are enclosed with a rectangle to form one cluster. In FIG. 9, the objects are divided into five clusters. Data indicative of objects is broadcasted from the BCMC 10, and fetched to the cell processor 20 on a cluster-by-cluster basis. The cell processor 20 performs processing about the position and movement in the space in connection with the fetched objects included in one cluster.

In the example of FIG. 5, cell processors A to E perform processing of objects divided into five clusters.

Figure 10:
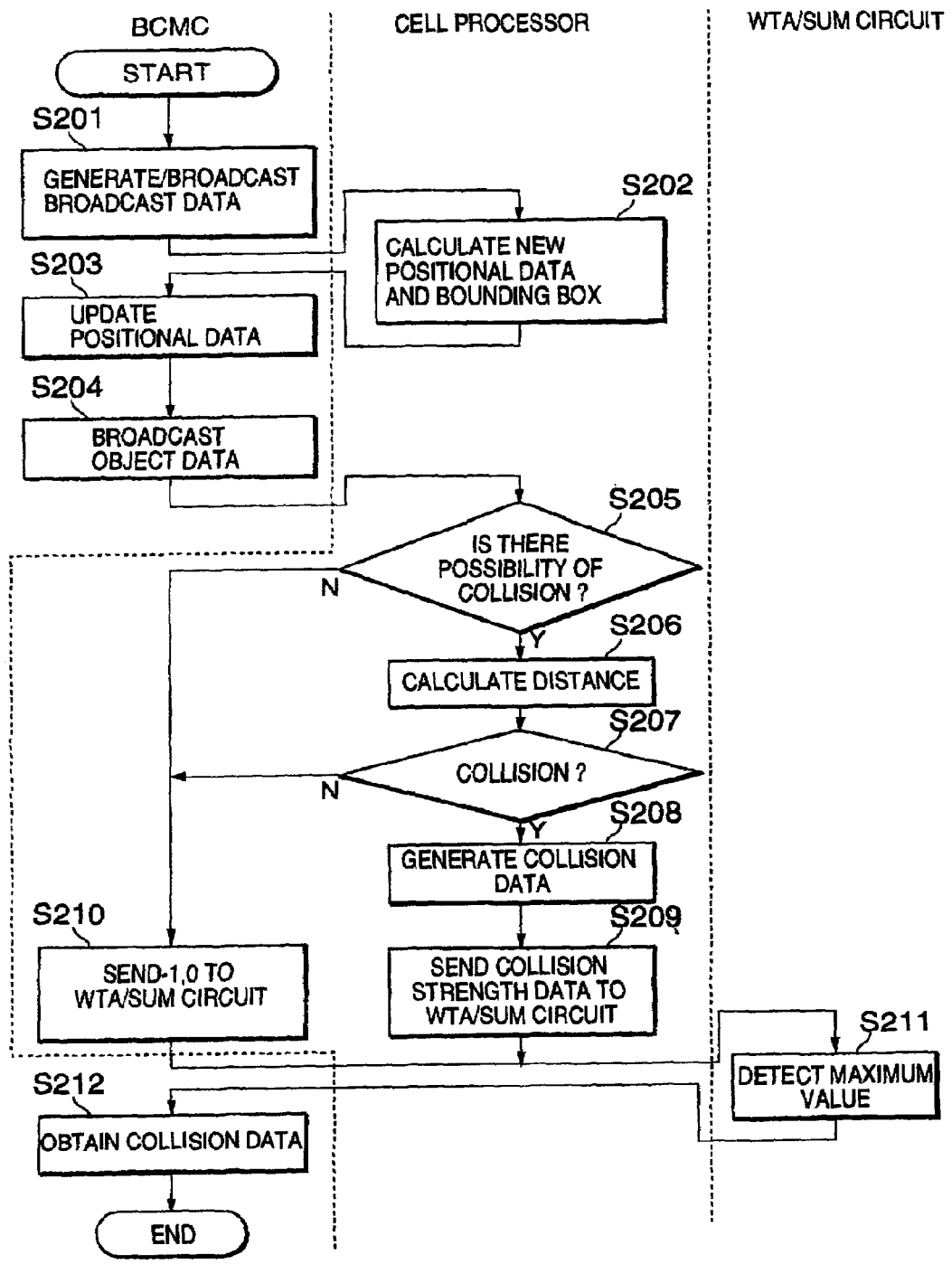
FIG. 10 is a flowchart illustrating the flow of processing of a collision determination algorithm according to the present invention.

The flow of processing about collision determination algorithm will be explained with reference to FIG. 10, The BCMC 10 generates broadcast data including object data having data of object position and velocity and cluster data indicative of a cluster to which the corresponding object belongs, and broadcasts them to all cell processors 20 (step S201). Each cell processor 20 sorts out object data from broadcast data based on cluster data and fetches it.

The cell processor 20 that has fetched object data calculates new positional data from current positional data of the object and velocity data after a unit of time. The cell processor 20 obtains a value of a new bounding box from new positional data (step S202). The bounding box means a rectangle that encloses the objects as in, for example, FIG. 9. The value of bounding box is coordinates of the vertex of the bounding box.

The BCMC 10 fetches new positional data of objects from each cell processor 20 and updates positional data (step S203).

Next, the BCMC 10 broadcasts object data including obtained new positional data and so on to all cell processors 20 one by one (step S204). Namely, the BCMC 10 sends positional data, which indicates the position of one object as a target to be subjected to collision determination (hereinafter referred to as "determining objects"), to all cell processors 20.

Each cell processor 20 first determines whether or not there is a possibility that collision of determination object will occur using the bounding box calculated by step S202 (step S205). More specifically, the cell processor 20 determines whether or not the position of the determining object is present in the bounding box.

In the case where there is a possibility that collision of determination object will occur, that is, the determining object is present in the bounding box (step S205: YES), the cell processor 20 calculates the distance between the respective objects in the bounding box to be processed sequentially (step S206) to determine the occurrence of collision (step S207). In the case where the determining object collides with any one of objects in the bounding box (step S207. YES), the cell processor 20 generates collision data including data (collision strength data), which quantitatively indicates the strength of impact caused by collision, and data, which indicates influence upon the determining object caused by collision (step S208). Moreover, the cell processor 20 sends collision strength data among generated collision data to the WTA/sum circuit 30 together with its ID (step S209).

When the determining object is present out of the bounding box (step S205: NO), or the determining object does not collide with any one of objects as a result of the calculation of distance (step S207: NO), each cell processor 20 sends, for example, "−1, 0" as collision strength data to the WTA/sum circuit 30 (step S210).

The WTA/sum circuit 30 operates in the maximum value mode. The WTA/sum circuit 30 performs comparison between collision strength data sent from the cell processors 20, and detects collision strength data, which indicates the highest strength of impact of impact caused by collision (step S211). Then, the WTA/sum circuit 30 specifies the cell processor 20 that has generated collision strength data detected. After that, the WTA/sum circuit 30 sends ID, which indicates the specified cell processor 20, to the BCMC 10.

The BCMC 10 obtains collision data from the cell processor 20, which is shown by ID sent from the uppermost stage of WTA/sum circuit 30 (step S212). By providing processing after step 204 to all objects, determination of collision among all objects in the space is performed.

[Fifth Embodiment]

An explanation will be next given of an example using an adder 305 of the WTA/sum circuit 30.

Each cell processor 20 inputs the result of data processing to the WTA/sum circuit 30. In the WTA/sum circuit 30, the adder 305 adds the result of data processing and resultantly obtains the sum of the results of data processing in connection with all cell processors 20. In this way, the sum of the results of data processing can be obtained at high speed by the WTA/sum circuit 30.

The sum of the results of data processing is sent to the BCMC 10 by which the sum can be transmitted to all cell processors 20 at high speed. The sum of the results of data processing is used to normalize calculation in connection with an optimization calculation used in such as a neuro-computer.

In the above explanation, through BCMC 10 and WTA/sum circuit are formed independently of each other, WTA/sum circuit 30 may be incorporated into BCMC 10 to configure a controller as one block.

Additionally, the above has explained the example in which data processing means is cell processors 20 and controlling means is the controller (BCMC 10). However, the configuration components of the present invention are not limited to the above example.

For example, the following configuration may be possible.

Namely, two or more data processing terminals are connected in the form that two-way communication is possible via a wide-area network. Among these data processing terminals, one or a plurality of data processing terminals is operated as control means and the others are operated as data processing means. Control means is provided with a function of broadcasting broadcast data including the result of data processing received from some or all of the plurality of data processing means and data used for data processing executed by at least one data processing. Each of the plurality of data processing means is provided with a function of sorting out only data necessary for data processing executed by each processing means from broadcast data broadcasted by control means to perform data processing and transmit the result of processing to control means.

Moreover, the following configuration may be possible.

Namely, a plurality of general-purpose data processing terminals, which is capable of specifying predetermined identification information (for example, the aforementioned identification data), is used as a plurality of data processing means. Then, a data processing system may be configured by only a server, which is capable of performing two-way communication with these general-purpose data processing terminals, or an apparatus provided with a semiconductor device including a CPU and memory therein.

Regarding the server or apparatus of this case, the CPU provided in its interior reads a given computer program and executes it. This provides the following functions to the server main body or apparatus. Namely, the function is to specify at least one data processing terminal as data processing means to generate broadcast data including identification information of the specified data processing terminal and data processing data directed to the data processing terminal. Another function is to obtain the result of data processing executed by the corresponding data processing terminal from some or all of the plurality of data processing terminals. Still another function is to include the received result of processing in broadcast data and broadcast the corresponding broadcast data to each of the plurality of data processing terminals.

The above-mentioned present invention makes it possible to efficiently perform data processing among data processing means in the case of using the plurality of data processing means.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A multi-processor system, comprising:

a plurality of processors each operable to perform data processing, each of said plurality of processors being assigned identification data for identifying such processor;

a controller operable to broadcast broadcast data to all of said plurality of processors, the broadcast data including data usable by said plurality of data processors in performing the data processing; and a sort mechanism operable to receive the identification data from ones of said plurality of processors when each of said ones of said plurality of processors completes the data processing, the sort mechanism being operable to send the identification data received from said ones of said plurality of processors to said controller in a predetermined order, wherein said controller is operable to obtain at least some of the identification data from said sort mechanism to use as obtained identification data, to obtain results of the data processing completed by said ones of said plurality of processors based on the obtained identification data, and to generate and broadcast the broadcast data to all of said plurality of processors, the broadcast data including the obtained results and at least some of the obtained identification data, each of said plurality of processors is operable to generate priority data usable by said controller to determine an order of reading the results of the data processing, to receive the broadcast data and sort out data necessary to perform the data processing from the received broadcast data based on the identification data included in the received broadcast data, and to send the priority data to said sort mechanism together with the identification data identifying such processor upon completing the data processing, and said sort mechanism is operable to determine, based on the priority data, an order in which said ones of said plurality of processors send the identification data.

2. The multi-processor system according to claim 1, wherein said sort mechanism includes a plurality of registers, each one of said plurality of registers being associated with one of said plurality of processors, and said sort mechanism is operable to record the priority data and the identification data received from said ones of said plurality of processors in said registers associated with said ones of said plurality of processors, and said sort mechanism further includes a comparator operable to compare the priority data to determine an order in which the identification data is recorded in said registers, and said sort mechanism is operable to determine an order in which the recorded identification data is sent by said ones of said plurality of processors based on said order determined by said comparator.

3. The multi-processor system according to claim 1, wherein said controller includes:

a memory operable to store data, a storage controller operable to:
obtain the results of the data processing performed by said ones of said plurality of processors based on the obtained identification data,
store the obtained results in said memory, and
generate the broadcast data, the broadcast data including the stored results and the obtained identification data.

4. The multi-processor system according to claim 3, wherein each of said plurality of processors is operable to determine whether the data necessary for the data processing performed by such processor is included in the broadcast data, to perform the data processing after sorting out the data necessary for the data processing, if any, to send to said controller the results of the data processing performed by such processor together with the identification data identifying such processor in response to a request from said controller, and to send process end notifying data to said sort mechanism in response to completion of the data processing, the process end notifying data including identification data identifying the completed data processing.

5. The multi-processor system according to claim 1, wherein at least some of said plurality of processors are connected to each other in a ring topology via a shared memory, and data are transmitted and received between said at least some processors connected in the ring topology through said shared memory.

6. A method of data processing for performance by a computer system having a plurality of processors operable to perform data processing, the method comprising:

receiving at least some of the identification data by a controller of the computer from a sort mechanism of the computer, the controller being operable to broadcast broadcast data to the plurality of processors, the broadcast data including the data used in the data processing, each one of the plurality of processors being assigned identification data identifying such processor and the sort mechanism being operable to receive the identification data from ones of the plurality of processors when the ones of the plurality of processors complete the data processing, the sort mechanism further being operable to send the received identification data to the controller in a predetermined order;

obtaining, by the controller, the results of the data processing performed by the ones of the plurality of processors, based on the identification data received from the sort mechanism;

generating and broadcasting the broadcast data to all of the plurality of processors, the broadcast data including results of the data processing and at least some of the identification data received by the controller;

generating, by each of the plurality of processors, priority data usable by the controller to determine an order of reading the results of the data processing performed by the ones of the plurality of processors;

sorting out data necessary to perform the data processing based on the identification data included in the broadcast data broadcasted by the controller;

performing the data processing by the ones of the plurality of processors using the sorted out data;

sending priority data from the ones of the plurality of processors to the sort mechanism upon the ones of the plurality of processors completing data processing, the priority data relating to the data processing performed by the ones of the plurality of processors together with identification data identifying the ones of the plurality of processors; and determining, based on the priority data, an order by which the ones of the plurality of processors send the identification data.

7. A data processing system, comprising:

a plurality of data processing means to performing data processing, each of said plurality of data processing means being assigned identification data for identifying such data processing means;

a control means; and a sort means operable to obtain the identification data from ones of said plurality of data processing means upon said ones of said plurality of data processing means completing the data processing, the sort means being operable to send the obtained identification data to said control means in a predetermined order, wherein said control means is operable to obtain results of the data processing performed by any of said ones of said plurality of data processing means based on the identification data received from said sort means, and to generate and broadcast broadcast data to all of said plurality of data processing means, the broadcast data including the results of the data processing performed by said ones of said plurality of data processing means and the identification data identifying said ones of said plurality of data processing means, each of said plurality of data processing means is operable to (a) generate priority data usable to determine an order of reading the results of the data processing by said control means, (b) sort out data necessary to perform the data processing based on the identification data included in the broadcast data, (c) perform the data processing after sorting out the data necessary to perform the data processing, and to send the priority data to said sort means together with the identification data identifying such processor upon completing the data processing, the priority data being related to the data processing, and said sort means is operable to determine an order in which the identification data is sent by each such processor based on the priority data.

8. A data processing system operable to perform two-way communication between a plurality of data processing means, comprising:

a plurality of data processing means, each one of the plurality of data processing means being assigned identification data identifying such data processing means, and being operable to perform data processing after sorting out data necessary to perform the data processing, and to send priority data relating to the data processing together with the identification data identifying such data processing means upon completing the data processing;

sort means operable to determine based on the priority data, an order in which ones of said plurality of data processing means send the identification data, said sort means being operable to receive the identification data in the determined order from said ones of said plurality of data processing means after said ones complete the data processing;

means for obtaining the results of the data processing from said ones of said plurality of data processing means and for generating the broadcast data including the identification data identifying said ones of said plurality of data processing means and the results of the data processing performed by said ones of said plurality of data processing means; and means for broadcasting the broadcast data to said plurality of data processing means, wherein said plurality of data processing means are operable to sort out the data necessary to perform the data processing based on the identification data included in the broadcast data, and said means for obtaining the results of the data processing from said ones of said plurality of data processing means obtains the results of the data processing based on the identification data received from said sort means.

9. A computer-readable storage medium having information recorded thereon for use by an apparatus including a computer to perform a method of two-way communication between a plurality of data processing means, said method comprising:

sorting out data necessary to perform data processing by ones of a plurality of data processing means;

performing the data processing by said ones of said plurality of data processing means;

sending priority data relating to the data processing by said ones of said plurality of data processing means together with identification data identifying said ones of said plurality of data processing means upon said ones of said plurality of data processing means completing the data processing;

determining, based on the priority data, an order in which said ones of said plurality of data processing means send the identification data;

receiving the identification data in the determined order from said ones of said plurality of data processing means after said ones of said plurality of data processing means complete the data processing;

obtaining the results of the data processing from said ones of said plurality of data processing means based on the determined order; and generating the broadcast data including the identification data identifying said ones of said plurality of data processing means and the results of the data processing performed by said ones or said plurality of data processing means; and broadcasting the broadcast data to said plurality of data processing means.

10. A computer-readable storage medium having information recorded thereon for use by an apparatus including a computer to perform a method of two-way communication between a plurality of data processing means of said computer, said method comprising:

receiving identification data and priority data sent by ones of said plurality of data processing means upon said ones of said plurality of data processing means completing data processing, said identification data assigned to each of said plurality of data processing means for identifying such data processing means, the priority data relating to the data processing, at least said ones of said plurality of data processing means being operable to perform the data processing after sorting out data necessary to perform the data processing based on the received identification data;

determining an order in which said ones of said plurality of data processing means send the identification data based on the priority data;

receiving the identification data in the determined order;

obtaining the results of the data processing from any of said ones of said plurality of data processing means based on the identification data sent by said ones of said plurality of data processing means;

generating broadcast data including the identification data identifying said ones of said plurality of data processing means and the results of the data processing performed by said ones of said plurality of data processing means; and broadcasting the broadcast data to said plurality of data processing means.

11. A semiconductor device for use within an apparatus including a computer to perform a method of two-way communication between a plurality of data processing means of said computer, said method comprising:

receiving identification data and priority data sent by ones of said plurality of data processing means upon said ones of said plurality of data processing means completing data processing, said identification data assigned to each of said plurality of data processing means for identifying such data processing means, the priority data relating to the data processing, at least said ones of said plurality of data processing means being operable to perform the data processing after sorting out data necessary to perform the data processing based on the received identification data;

determining an order in which said ones of said plurality of data processing means send the identification data based on the priority data;

receiving the identification data in the determined order;

obtaining the results of the data processing from any of said ones of said plurality of data processing means based on the identification data sent by said ones of said plurality of data processing means;

generating broadcast data including the identification data identifying said ones of said plurality of data processing means and the results of the data processing performed by said ones of said plurality of data processing means; and broadcasting the broadcast data to said plurality of data processing means.

* * * * *

UNITED STATES PATENT AND TRADEMARK OFFICE
CERTIFICATE OF CORRECTION

PATENT NO. : 7,017,158 B2
APPLICATION NO. : 09/964247
DATED : March 21, 2006
INVENTOR(S) : Nobuo Sasaki It is certified that error appears in the above-identified patent and that said Letters Patent is hereby corrected as shown below:

On the Title Page, col. 2
(57) ABSTRACT, line 7 after BCMC "to" should read --so--.

Column 1, line 22 "advance" should read --advances--.
Column 2, line 15 after "invention" delete --is--.
Column 2, line 56 after "mechanism" insert --which--.
Column 3, line 42 "comprising" should read --comprises--.
Column 4, line 58 after "one" insert --of--.
Column 5, line 13 after "one" insert --of--.
Column 9, line 15 "perform's" should read --performs--.
Column 10, line 23 "Namely," should read --namely,--.
Column 12, line 10 "processor" should read --processors--.
Column 12, line 37 "i:" should read --i=--.
Column 18, line 19 "to" should read --for--.
Column 19, line 1 after "determine" insert --,--.
Column 19, line 53 "or" should read --of--.

Signed and Sealed this

First Day of August, 2006

JON W. DUDAS
*Director of the United States Patent and Trademark Office*